(12) United States Patent
Lei et al.

(10) Patent No.: US 10,914,603 B2
(45) Date of Patent: Feb. 9, 2021

(54) METHOD AND APPARATUS FOR NOISE-ADAPTIVE VEHICLE NAVIGATION

(71) Applicant: FORD GLOBAL TECHNOLOGIES, LLC, Dearborn, MI (US)

(72) Inventors: Oliver Lei, Windsor (CA); Allen R. Murray, Lake Orion, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 15/871,481

(22) Filed: Jan. 15, 2018

(65) Prior Publication Data

US 2019/0219414 A1   Jul. 18, 2019

(51) Int. Cl.
  *G01C 21/34* (2006.01)
  *B60R 16/037* (2006.01)
  *G01C 21/36* (2006.01)

(52) U.S. Cl.
  CPC ...... *G01C 21/3484* (2013.01); *B60R 16/0373* (2013.01); *G01C 21/3697* (2013.01)

(58) Field of Classification Search
  CPC ............ G01C 21/3484; G01C 21/3697; B60R 16/0373
  See application file for complete search history.

(56) References Cited

U.S. PATENT DOCUMENTS

| | | | | | |
|---|---|---|---|---|---|
| 3,940,412 | A | * | 2/1976 | Pissiotas | C07D 233/68 548/343.1 |
| 5,521,594 | A | * | 5/1996 | Fukushima | B60G 17/0165 340/901 |
| 7,941,189 | B2 | * | 5/2011 | Miyauchi | G10L 21/0208 455/569.2 |
| 9,062,983 | B2 | * | 6/2015 | Zych | G01C 21/20 |
| 9,899,018 | B2 | * | 2/2018 | Valeri | G01H 3/14 |
| 2008/0188271 | A1 | * | 8/2008 | Miyauchi | G10L 21/0208 455/569.2 |
| 2014/0257621 | A1 | * | 9/2014 | Zych | G01C 21/20 701/25 |
| 2017/0232915 | A1 | * | 8/2017 | Dufford | G01C 21/343 701/48 |
| 2017/0356747 | A1 | * | 12/2017 | Iagnemma | G05D 1/0088 |
| 2018/0004211 | A1 | * | 1/2018 | Grimm | G01C 21/3407 |
| 2018/0038705 | A1 | * | 2/2018 | Bills | G01C 21/3484 |

FOREIGN PATENT DOCUMENTS

| | | |
|---|---|---|
| JP | 2003344083 A | 12/2003 |
| WO | 2017012982 A1 | 1/2017 |

* cited by examiner

*Primary Examiner* — Russell Frejd
(74) *Attorney, Agent, or Firm* — Michael Spenner; Brooks Kushman P.C.

(57) ABSTRACT

A system includes a processor configured to receive a route request including at least one ride-comfort parameter. The processor is also configured to determine a route including a road for which predefined comfort characteristics corresponding to the ride-comfort parameter meet the included ride-comfort parameter and return the route responsive to completing the determination.

1 Claim, 3 Drawing Sheets

METHOD AND APPARATUS FOR NOISE-ADAPTIVE VEHICLE NAVIGATION

TECHNICAL FIELD

The illustrative embodiments generally relate to methods and apparatuses for noise-adaptive vehicle navigation.

BACKGROUND

Drivers and occupants typically prefer a smooth, quiet ride. In furtherance of this preference, vehicle original equipment manufacturers (OEMs) have long utilized both active and passive noise-dampening solutions. Active solutions may attempt to modify a vehicle sound or physical profile to accommodate for a bumpy/noisy ride, and passive solutions work to generally counteract commonly experienced conditions which generate noise and bumpiness.

Despite all of this work, certain roads may have characteristics which cannot be completely counteracted by an OEM's efforts in noise reduction and ride smoothing. Large potholes, gravely or broken road composition and other unusually large or persistent characteristics act to make a ride on some roads simply "loud" or "bumpy." Similarly, many freshly paved roads result in a ride which is both quiet and smooth, even in a vehicle with very limited noise/bumpiness cancellation.

SUMMARY

In a first illustrative embodiment, a system includes a processor configured to receive a route request including at least one ride-comfort parameter. The processor is also configured to determine a route including a road for which predefined comfort characteristics corresponding to the ride-comfort parameter meet the included ride-comfort parameter and return the route responsive to completing the determination.

A system including a processor configured to receive an expected comfort-parameter profile, predicting an aspect of a comfort-parameter expected over a predefined stretch of upcoming road. The processor is also configured to detect an actual aspect of the comfort-parameter as a vehicle travels over the upcoming road. The processor is further configured to determine an abnormality in the actual aspect outside a predefined range corresponding to the predicted aspect and, responsive to the abnormality, report the abnormality to a driver as likely indicative of a vehicle problem.

In a third illustrative embodiment, a computer-implemented method includes determining a route that most closely accommodates the driver preference and utilizing the determined route to navigate to a destination, responsive to receiving a driver preference corresponding to a ride-comfort parameter for an upcoming route.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
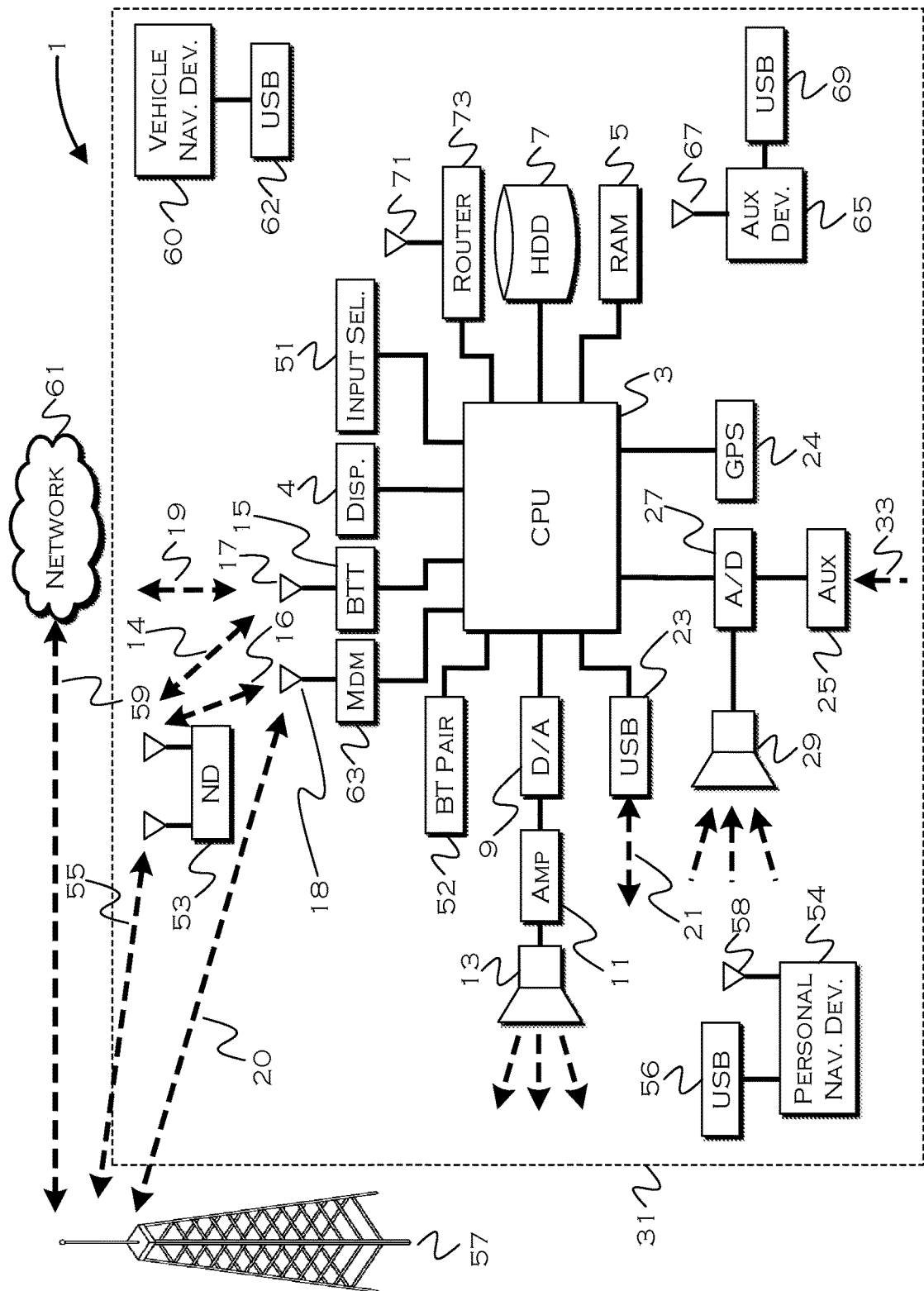
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 802.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments can be applied to a variety of road-characteristics to achieve results similar to those described. While the illustrative embodiments speak in terms of noise or bumpiness, similar concepts could be applied to restrict travel to roads of other characteristics and/or generate expected performance profiles under other characteristics in a similar manner. Also, ambient environmental conditions can be addressed in a similar matter, for example, when an illustrative process discusses "noise," that does not have to mean road-noise, it could also refer to ambient environmental noise, such as construction noise or, for example, water/animal noise.

The illustrative embodiments allow for crowd-sourcing of road-noise/bumpiness (or other characteristics) and then navigation related adaptation to those characteristics, such as avoidance or vehicle-system accommodation. Further, with sufficient data, the level of noise experienced by a certain model of vehicle, or even models of vehicles having certain components, can be predicted, to improve decision making process with regards to at least both navigation and to new models of a vehicle.

Figure 2:
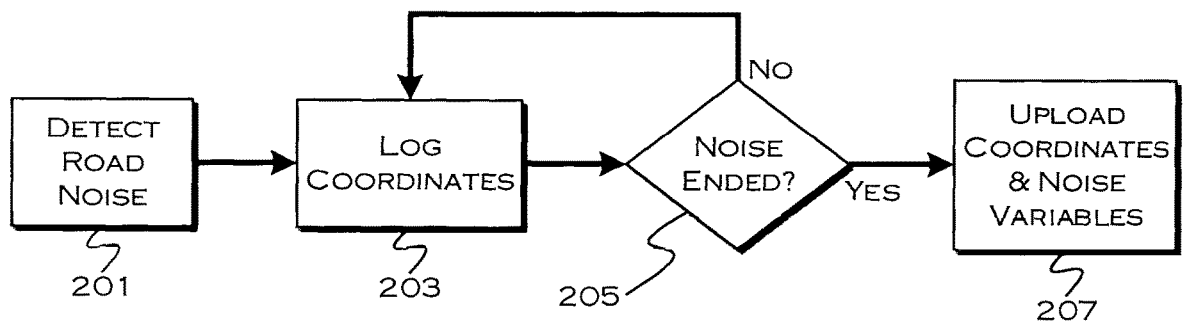
FIG. 2 shows an illustrative process for noise profile gathering.

FIG. 2 shows an illustrative process for noise profile gathering. In this illustrative example, a large number of users are used to crowd-source road-noise data. Since different vehicles may experience different noise along the same route, aggregate data profiles can determine minimum noise levels, maximum noise levels, whether the noise is likely long-term or temporary, and whether the noise is relative to which vehicles is being driven, among other things. Thus, a very comprehensive model of roads from a noise/bumpiness perspective can be built, which can feed back into a variety of a vehicle's navigation-related systems, often producing different conclusions about conditions likely to be experienced depending on vehicle make/model/configuration.

In the example shown in FIG. 2, the process detects 201 an element of noise or bumpiness at a given location or over a given stretch of road. The process may log 203 coordinates over the stretch of road where the noise or bumpiness occurs, and continue to do so until the condition ends 205.

Once the condition ends, the process may upload 207 a recording (or parameters) of the noise or bumpiness experienced, as well as a vehicle profile and any other potentially relevant characteristics (weather, time of day, etc.). Over time, it may be revealed that certain variables do not impact road noise, but, for example, if construction occurs between 8 AM and 7 PM, then the noise profiles for a road could be significantly different based on time of day. Weather conditions may also contribute to noise, for example, a road covered in packed snow under cold conditions can have a "crunchy" sound that would not be present under most other conditions.

Accordingly, the data gathering process can err on the side of over-inclusion and discard irrelevant data, when sufficient data has been gathered to make a relevance determination. If this or similar methods are repeated by thousands of vehicles traveling tens of thousands of miles of road on a daily basis, comprehensive road profiles can be quickly built for heavily trafficked roads, and eventually most roads should be mapped and refined from a noise/bumpiness perspective.

Figure 3:
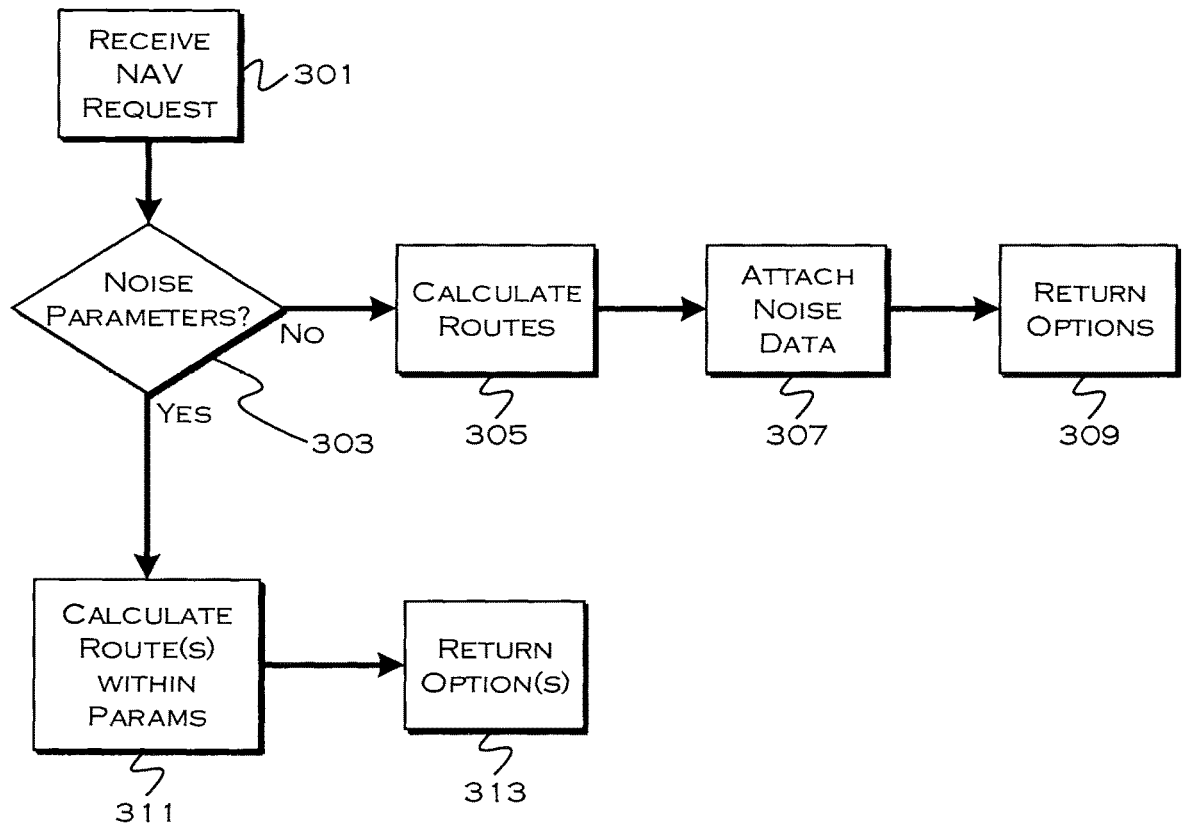
FIG. 3 shows an illustrative process for navigation accommodating noise.

FIG. 3 shows an illustrative process for navigation accommodating noise. Once sufficient noise data has been gathered for a given coordinate set (area, road stretch, location, etc.), the illustrative processes, and the like, can use this data to improve the driving experience. For example, if a driver has an important business call to handle over hands-free calling, the driver may want to avoid a loud and bumpy road. A driver with a full mug of hot coffee may want to avoid an overly bumpy route. At the same time, a driver trying to soothe an infant to sleep may want a bumpy road with a moderate noise profile (thus, it is not always the case that the result should simply be "avoid bumps and noise").

Also, with sufficient data from varied vehicles, road profile experience variations can be mapped to makes, models, weights, tire types, option packages, etc. Thus, under those advanced models, navigation adjustments can actually accommodate the specific type of vehicle driven by a particular driver.

In this example, if the navigation request includes noise parameters 303, the process uses noise/surface models to calculate 311 one or more routes to accommodate the specified parameters.

So, for example, in the phone call example above, the driver may specify low bumpiness and low noise (assuming a sort of high/medium/low oversimplified scale), with a preference for lower noise over lower bumpiness, if both cannot be reasonably achieved. In response, the process could find one or more routes to a destination. If the driver isn't using navigation to a destination specifically, the process could still use colors or designators on a navigation display to guide the driver in road-choices based on bumpiness or noise.

In the coffee example, the driver may want absolutely minimal bumpiness, but can prefer timeliness over noise-reduction. Thus, the navigation process could find the smoothest, fastest route, even if that route was very noisy for some reason. This would get the driver to the destination as quickly as possible, while helping minimize coffee spills.

In the baby-sleeping example, the driver may request a medium bumpy route with a low (but not minimal) noise profile. This provides some soothing bumpiness as well as the quasi white-noise of travel. Again, in any of these examples, the driver could prioritize variables, and/or simply request that a navigation display.

The process may return 313 any routes that meet the specified parameters. These routes may also be ordered based on best matches, and may otherwise indicate how many parameters are met by a given route. Ride comfort parameters, such as noise and bumpiness, can be specified in a scale (e.g., high, med, low), in explicit values (e.g., as decibel values), on a sliding scale (e.g., 1 to 10) or in any other suitable method. The parameters may also specify preferred maximums, or a range. The request may further specify whether or not a route should even be considered if a maximum is exceeded (e.g., all or nothing). That is, it may be somewhat useless for a driver seeking to avoid bumps to accept a route that has 20% very bumpy roads and only 80% roads which meet a preference. If there is no "valid" route meeting parameters as specified, the driver may simply decide to take the fastest route and drive carefully. Drivers can choose whether they want a "best fit" option, an "all or nothing" option or any other suitable decision for whether or not parameters are met within the driver's actual preferences. In a simpler example, the driver inputs parameter preferences and the system simply returns one or more routes that best meet the specified parameters.

A given route may be chosen based on a single road meeting a parameter or a predefined percentage amount of the route meeting the parameter. In other instances, the process may prioritize tying certain portions of the route to a parameter. For example, if the parameter was "bumpiness," the process may try to find routes where travel over a threshold speed more closely met the parameter, because a driver traveling at lower speeds can more easily accommodate a bumpy road. So, for example, the process may prioritize a ten mile route having five miles of smooth 70 mph highway travel and five miles of 30 mph dirt road travel over a route having only two miles of 30 mph dirt road travel and 6 miles of 35 mph smooth paved road travel, because that second route may also include a heavily potholed 70 mph highway for two miles. The first route might be faster, and it would also allow the driver to lower the risk of a cracked axel by avoiding the fast, but damaged, highway.

If there are no noise-parameters included in a request, the process may calculate 305 a "smoothest" route and a "quietest" route (or any other comfort parameters) and may even attach 307 bumpiness or noise data to the routes. When the process returns 309 the options, the driver can see whether the best route (under driver preferences) is the smooth, or the quite or the fastest route, since these may be three different routes. If the noise/bumpiness data is included, the driver can also visually determine the benefit of a given route and/or the detriment of not-taking a given route.

Figure 4:
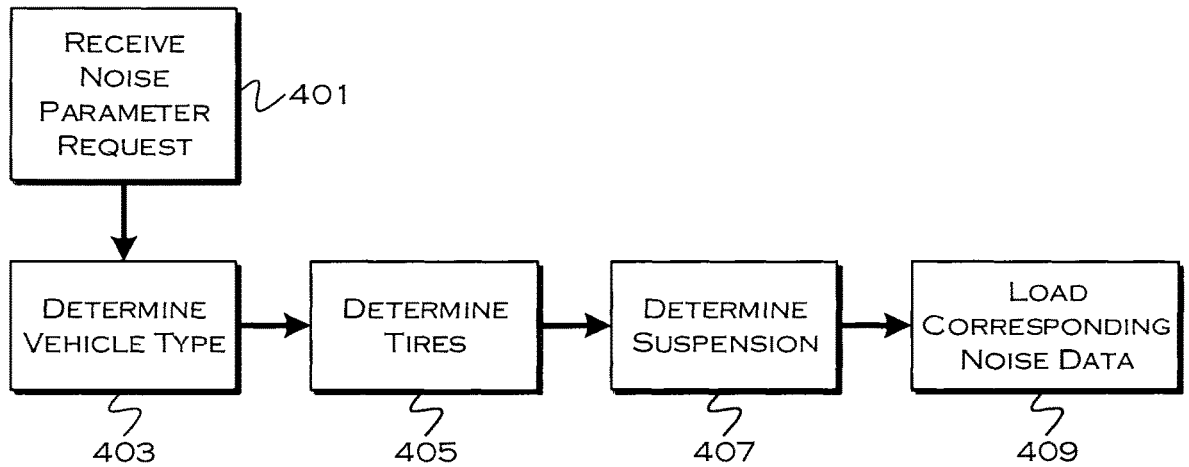
FIG. 4 shows an illustrative process for projecting noise expectations.

FIG. 4 shows an illustrative process for projecting noise expectations. In this example, the process has access to a database representing noise data for a given set of vehicle configurations and/or makes and models. This data can be tied to specific roads, or can even be modeled onto other roads for which this data has not yet been tracked. For example, if vehicles of type A and B experience a certain level of bumpiness and noise on one road, and a different level on another road, and vehicle type C only has provided data for the first road, the process should be able to extrapolate for the second road for vehicle C. If the physical characteristics of the first road caused vehicles of type A and B to experience certain noises and bumpiness, and those vehicles report the same noises and bumpiness on the second road, it may be reasonable to assume that the data for type C should match or closely match as well. Eventually the database will hopefully represent data for most roads, in terms of comfort-parameters, but until sufficient data exists, the process can attempt to use already know data to make educated guesses about roads for which insufficient data for a given request is present. The example shown assumes that sufficient data for a given vehicle and option set has already been reported and indexed for roads along a route.

In this example, the process receives the request, including a vehicle make/model and comfort-affecting characteristics of the vehicle, which can include features such as tires, tire pressure, suspension, etc.

The process determines 403 a data set corresponding to the vehicle type (make/model/class), which represents data for vehicles of that type on a given road. The process also determines 405 data for tires and/or tires at the known pressure. This may be either a lookup or an alteration of the previously determined data. That is, the process could look up Type X, Tire Y, Pressure Z, and if this data existed, the process could simply use the data. On the other hand, if Type X existed and sufficient Tire Y and Pressure Z data existed, just not for Type X, the process could determine the effect of Tire Y and Pressure Z on the resulting data (based on how it affected other vehicles) and perform a modification of the known data for vehicles of Type X on the roads. The process also determines 407 suspension effects, which can be done in a manner similar to tires. The same determination can be performed for other variable options (noise-dampening, weight, etc) to most closely model expected experience. The process then can load 409 the predicted noise/bumpiness data into the navigation engine for use in determining one or more routes.

Figure 5:
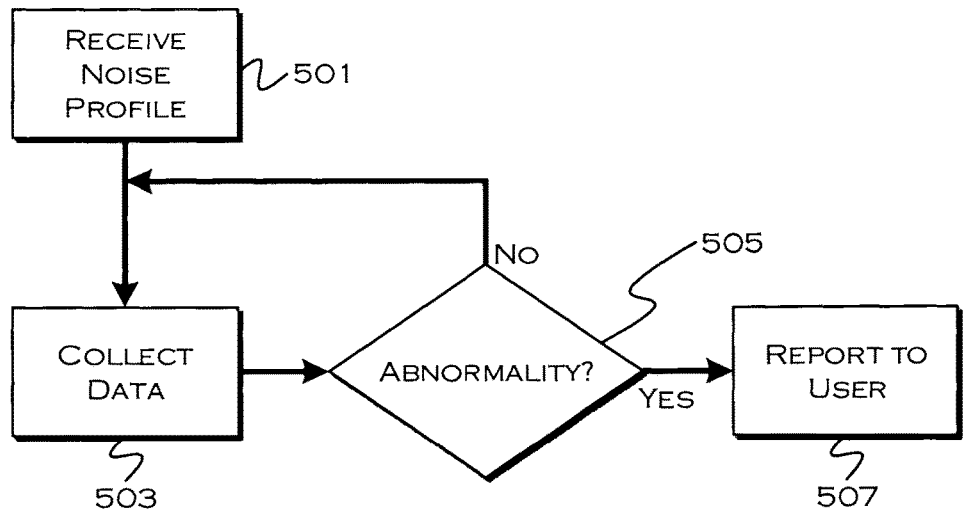
FIG. 5 shows an illustrative process for noise handling.

FIG. 5 shows an illustrative process for noise handling. Since the illustrative embodiments have access to a database of expected noise and bumpiness for roads, based on what other vehicles have experienced, not only can this data be used to select routes that meet certain comfort parameters, but the data may also be usable to determine vehicle problems. For example, if a vehicle expects to encounter noise of level N and bumpiness of level B, and if vehicles typically encounter the expected noise levels and/or bumpiness within a range surrounding N or B, then encountering noise or bumpiness outside this range may be indicative of a vehicle problem.

In this example, the process receives 501 an expected noise/bumpiness profile for an upcoming route or road segment. This process could execute in the background even in the absence of noise-routing utilization. That is, any time the vehicle is driving the process could receive expected data for upcoming roads within a mile or two (or any range), allowing the vehicle to self-monitor continually. In another example, the process may observe a diagnostic trouble state and begin requesting this data to see if the data can help better diagnose a problem.

It may even be possible, over a long enough time or with enough reported data, to actually determine a specific problem related to a certain noise level or bumpiness. That is, if anomalous noise or bumpiness is detected, that data can be recorded, and if there is an eventual resolution and identification of the problem, that problem can be tied to the anomaly. With enough anomalies, even this data could be cross referenced to determine what problem or type of problem a driver is experiencing.

In this example, the process records 503 noise data as the vehicle travels and compares the gathered data to expected data (the received data) to detect 505 any abnormalities. If there are sufficient abnormalities, the process may report 507 the fact of the abnormality to a user. For example, noise out of a certain decibel range, or vibration or shock force outside of an expected range.

As noted, in an advanced system with sufficient data, the process could even "guess" at the actual problem or class of problem based on previously observed, similar abnormalities. In this instance, the process could actually report the projected problem (e.g. low tire pressure) or class of problem (e.g., tire problem) to the user. While the example discusses noise, again, this sort of analysis can apply to bumpiness or other suitable comfort-affecting parameters.

Having expected data can also be useful in engaging active noise cancellation or developing a cancellation profile, automatically raising or lowering speaker volume to offset road noise, changing adaptive powertrain settings and otherwise acting in a manner to minimize (or not, as requested) the experience based on expected encountered comfort conditions.

The illustrative embodiments allow for drivers to specify certain comfort parameters when selecting a navigation route, and having the vehicle provide routes that better meet those parameters. In some examples, the vehicle can even use detected abnormalities (deviances from what is expected) as indicative of vehicle problems, or even to diagnose vehicle problems.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
a processor configured to:
receive an expected comfort-parameter profile, predicting an aspect of a comfort-parameter expected over a predefined stretch of upcoming road, wherein the aspect includes at least one of a predicted decibel level, predicted measured shock force level or predicted measured vibration level, and wherein the comfort-parameter includes at least one of noise or bumpiness;
detect an actual aspect of the comfort-parameter as a vehicle travels over the upcoming road;
determine an abnormality in the actual aspect outside a predefined range corresponding to the predicted aspect; and
responsive to the abnormality, report the abnormality to a driver as likely indicative of a vehicle malfunction.

* * * * *